United States Patent [19]

Hertwig et al.

[11] 4,104,189

[45] Aug. 1, 1978

[54] CURING AGENT FOR POLYSULFIDE-POLYMER COMPOSITIONS

[75] Inventors: Askan Hertwig, Seelze; Horst Krampitz, Lohnde, both of Fed. Rep. of Germany

[73] Assignee: Riedel-de Haen Aktiengesellschaft, Seelze, Hannover, Fed. Rep. of Germany

[21] Appl. No.: 751,071

[22] Filed: Dec. 16, 1976

[30] Foreign Application Priority Data

Dec. 18, 1975 [DE] Fed. Rep. of Germany ....... 2557012

[51] Int. Cl.² ...................... C08F 28/00; C08G 75/14
[52] U.S. Cl. ..................................... 252/186; 423/49; 423/605; 528/374
[58] Field of Search ................. 252/186, 182; 423/49, 423/605; 260/79.1

[56] References Cited

U.S. PATENT DOCUMENTS

| | | | |
|---|---|---|---|
| 3,767,780 | 10/1973 | Bellas et al. | 423/605 |
| 3,991,039 | 11/1976 | Gunter et al. | 260/79.1 |
| 4,036,822 | 7/1977 | Patel et al. | 260/79.1 |

*Primary Examiner*—Benjamin R. Padgett
*Assistant Examiner*—Irwin Gluck
*Attorney, Agent, or Firm*—Curtis, Morris & Safford

[57] ABSTRACT

Activated manganese (IV) oxide is used as a curing and vulcanizing agent for polysulfide polymers. By adjusting the following parameters the properties as a curing and vulcanizing agent can be influenced in a predictable way: (a) alkali metal content or foreign metal content; (b) water content; (c) specific surface. A process is described to adjust these parameters.

8 Claims, 4 Drawing Figures

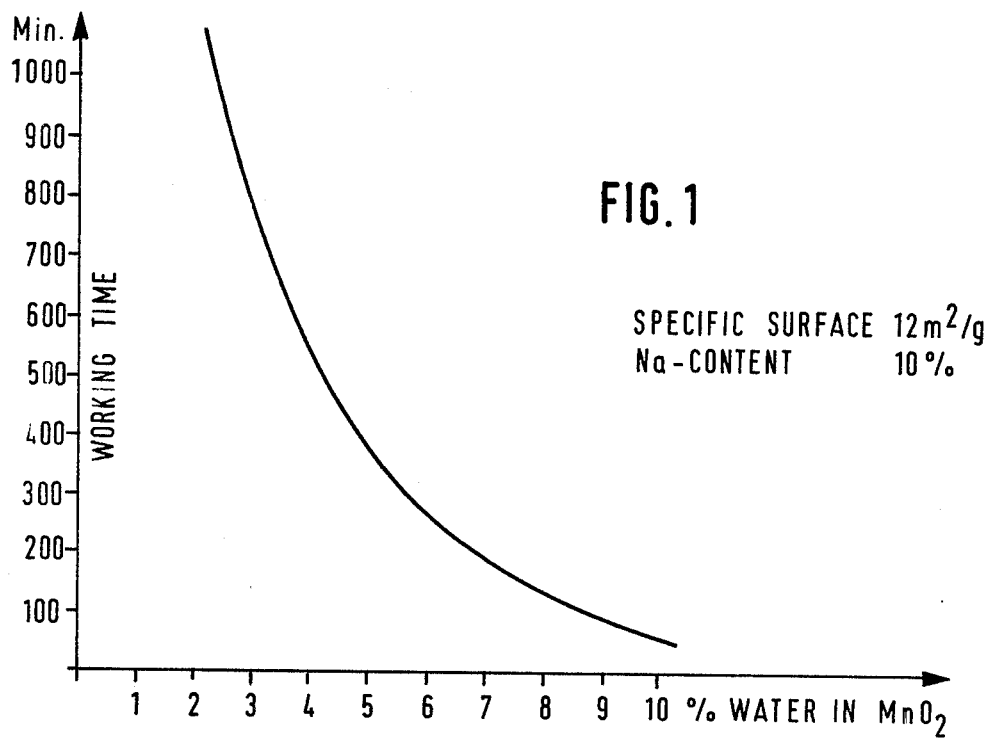
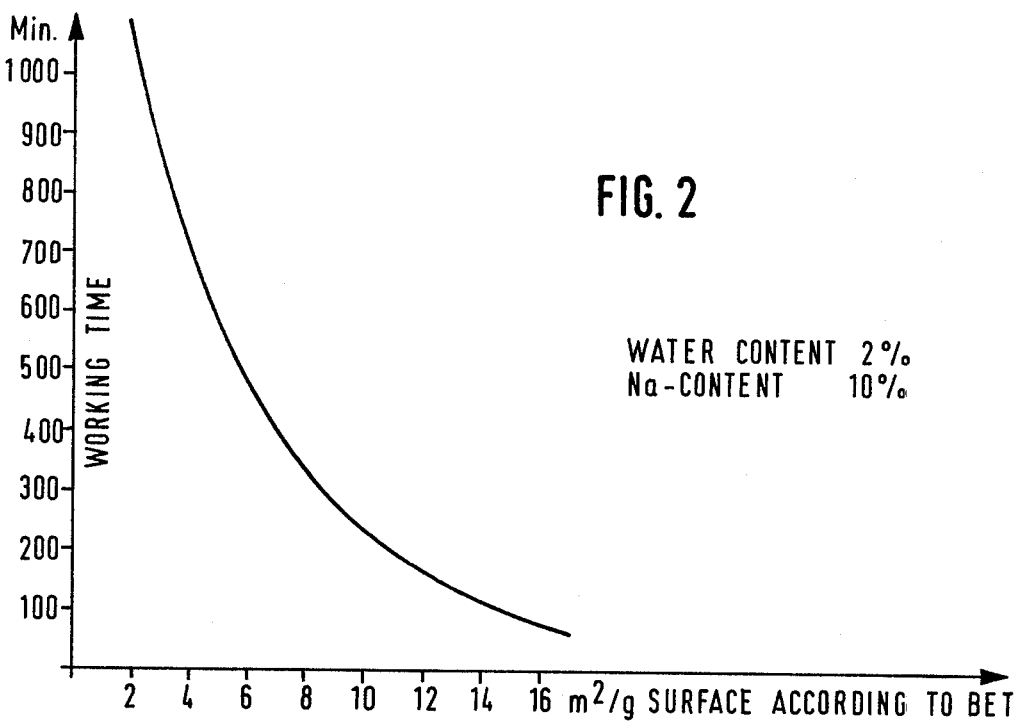

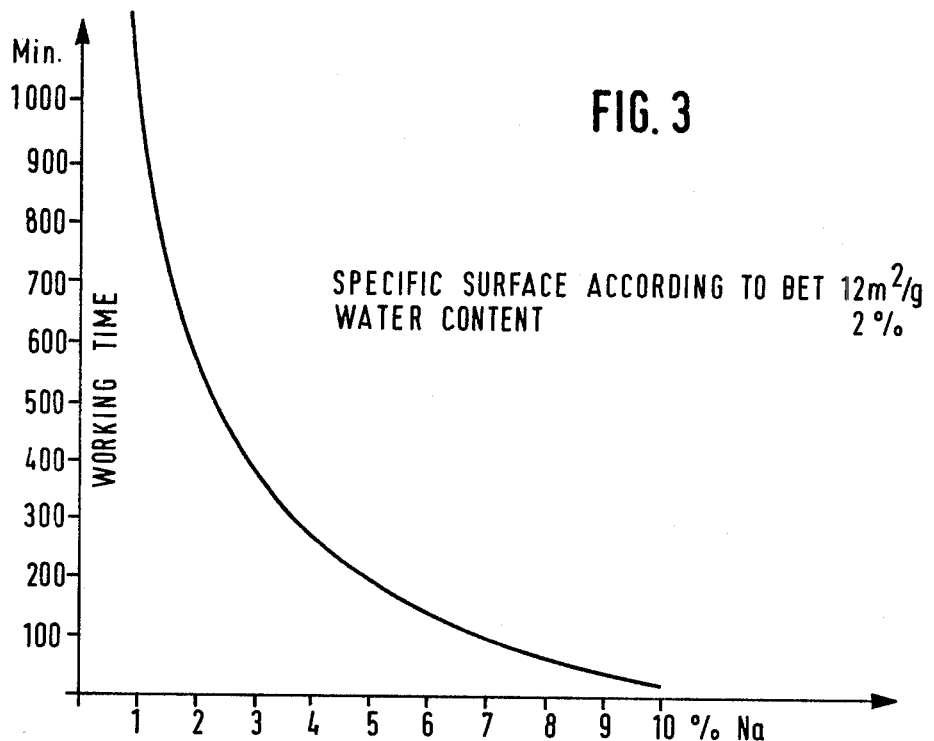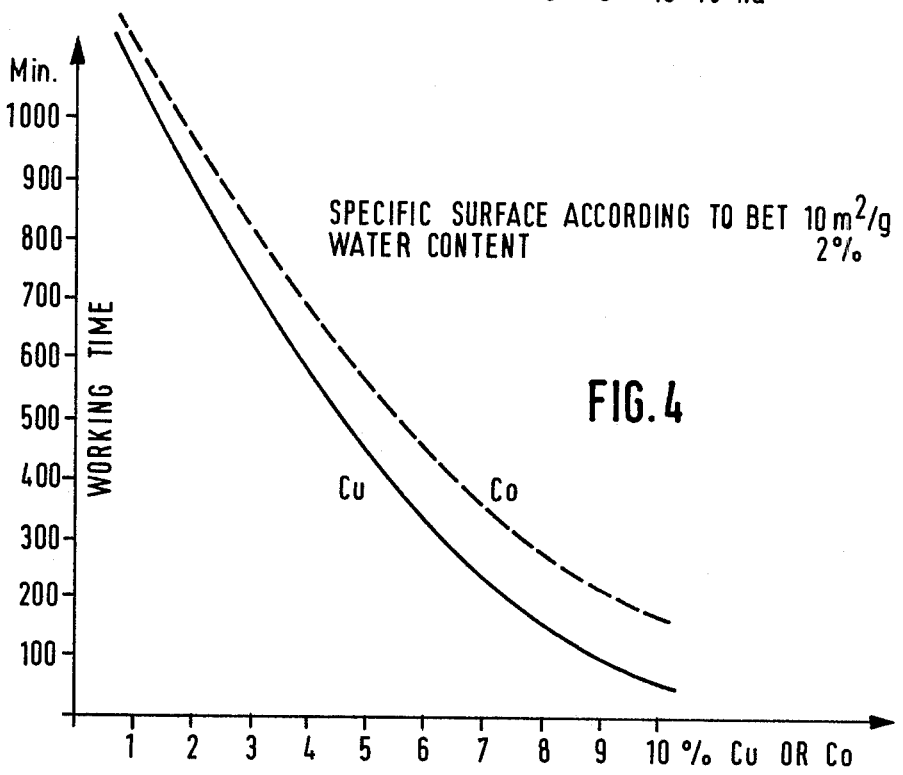

CURING AGENT FOR POLYSULFIDE-POLYMER COMPOSITIONS

The invention relates to the use of an activated manganese(IV) oxide as curing and vulcanizing agent for polysulfide polymers and to a process for the manufacture of said activated manganese(IV) oxide.

Rubber-like compositions may be prepared by curing polysulfide polymers. They are especially useful for sealing techniques. The curing effect is most often initiated by metal oxides which are frequently oxidants. Preference is generally given to a lead(IV) oxide which is prepared specifically for this purpose. Especially for sealing compositions for the manufacture of insulating glass with particularly strict requirements there is used more and more a curing agent consisting of manganese(IV) oxide. Such pastes have been described e.g. in U.S. Pat. Nos. 3,331,782 and 3,714,132.

So-called active manganese(IV) oxide has been used so far substantially for the manufacture of depolarization compositions in batteries and as selective oxidants for the organic chemistry. This active manganese(IV) oxide is prepared by electrolytic separation or by oxidation of manganese salt, operating most frequently in the aqueous phase. It has already been suggested as well to obtain an active manganese(IV) oxide by the hydration of manganese dioxide by reacting same with alkali lyes at elevated temperature. The products which have been prepared according to various processes and which are commercially available in various forms, are either entirely unsuitable for curing polysulfide, or their quality appears to be very irregular and insufficient for curing polysulfide, so that they cause great problems during the processing steps.

A further disadvantage is that all the products now commercially available have to be prepared from expensive manganese salts.

An essential subject of the present invention is therefore the manufacture of an active manganese(IV) oxide for curing polysulfide and having reproducible properties. Moreover, these properties should be easily adjustable to the intended purpose. For example, compositions to be used for the manufacture of insulating glass, should preferably be characterized by short processing and curing periods and a good adhesion to glass. On the other hand, compositions intended for use in the construction industry for sealing joints, should have long processing periods.

According to the present invention it is possible to prepare an excellent polysulfide curing agent having reproducible and adjustable properties tailored to various purposes. The essential point is that the properties of the curing agent can be influenced by three parameters directly and in a foreseeable manner:

(a) By means of the quantity of foreign metal built into or added to the lattice, various metals being also suitable.

(b) By means of the quantity of residual water in manganese(IV) oxide (by water is to be understood here the quantity which can be determined by measuring the loss after drying without stating how this quantity of water had been bound prior to drying) and p1 (c) by means of the particle size which is characterized by measuring the specific surface according to BET. The particle size is an approximate reference measurement respecting the number of lattice disturbances on which the degree of activity depends.

Solely by modifying these three parameters strictly tailored to the intended purpose it is possible to adapt the curing agent substantially to any purpose, and solely by precisely adhering to these 3 parameters for the product chosen for once it is possible to obtain evenly reproducible batches.

Suitable starting compounds for the employed manganese(IV) oxide are manganese compounds wherein the manganese has an oxidation number of 2 to 4, e.g. manganese oxide having formula $MnO_2$, $Mn_2O_3$ or $MnO$ or manganese compounds such as $MnCO_3$. The process according to the invention may also be carried out with manganese compounds which are formed as waste products during reactions using manganese dioxide or permanganate for oxidation. In the course of such oxidation processes a product is normally produced, often referred to as Weldon mud, which usually has an approximate composition represented by the formula $Mn_2O_3$. This product is a very suitable initial substance for carrying out the process according to the invention.

For economical reasons sodium hydroxide or potassium hydroxide are normally used as alkali hydroxide. If the treatment is carried out under normal pressure, a temperature most often is chosen such that, using aqueous alkali hydroxide solution, water is to a large extent removed. It has been found that the most useful temperatures are those from 120° to 400° C. Operations under elevated pressure (up to 15 bars) are carried out at temperatures preferably of 150° to 200° C. When operating below 120° C, no activated product is obtained. Treatment at temperatures exceeding 400° C often affect the activity of the product detrimentally.

Alkali hydroxide normally is added in an amount of 20 to 90 weight %, preferably of 30-60 weight %, calculated on the employed manganese(IV) oxide.

If manganese(IV) oxide is used as initial material, such as manganese dioxide or artificial manganese dioxide, the material being present most suitably in a finely dispersed form, is mixed either with solid alkali hydroxide and some water and this mixture is heated in an appropriate apparatus to temperatures of 120° to 400° C, or said material is suspended in an aqueous alkali hydroxide solution and most suitably heated to temperatures of 150° to 200° C under pressure up to 15 bars, while stirring. The treatment lasts for up to several hours.

In the case where a manganese compound is used as initial material in which the valency of manganese is below 4, oxygen or an oxygen-containing gas such as air is added during the alkali treatment, in order to bring about the conversion of the manganese compound to active manganese(IV) oxide. When the treatment is carried out in aqueous solution, the applied pressure has to exceed the vapor pressure of water or of the solution at the given temperatures.

The treatment lasts several hours, normally from 2-6 hours. The supply of oxygen or oxygen-containing gases is interrupted, when a removed sample shows that the manganese compound has undergone oxidation to tetravalent manganese.

When operating under normal pressure, a solid product is obtained, a treatment in an aqueous solution of an alkali hydroxide in a closed vessel provides a suspended product which has to be separated from the solution.

The quantity of the alkali metal absorbed in the manganese dioxide lattice can be reduced by washing with water to the degree required by the intended use. The quantity of the built-in alkali metal may also be influenced by applying different concentrations of the employed alkali lye. From 1–15% of alkali metal has been shown to be suitable. In order to achieve low alkali values, the washing step has to be carried out by adding acid to the water, in an amount of up to 10%.

If other than alkali metals are to be built into the lattice, the material which is washed to about 0.1% of alkali is stirred for 1 to 3 hours with the solution of a metal salt and then the washing is continued. Thereby an exchange of alkali by the desired metal, e.g. sodium to copper or cobalt, takes place.

If other than alkali metals are to be absorbed additionally in the lattice, the desired quantity can be blended into the batch concurrently with the manganese(IV) oxide.

The filter cake obtained after the washing step is now worked up with water to an about 35% suspension and ground in a Perl mill by adjusting the throughput speed so as to achieve the desired specific surface of 5–20 $m^2/g$. The grinding step may be omitted, if the specific surface has already achieve for the desired product by preceding treatments, a fact which may occur in the range of 5–8 $m^2/g$.

The order in which the washing and grinding steps are carried out, may be reversed also. It is possible as well to carry out the pulverization after the drying step, for example in a jet mill (micronizer).

The ground suspension is dried subsequently, preferably by spray drying. The latter step may be carried out in a parallel current or counter current, the spraying being executed by a rotating disc or by a spray nozzle. The exhaust air temperature is adjusted to the range of 80° to 130° C and the water content of the dried powder is thus adjusted to the desired value of from 0.1 to 8%.

These values may optionally be adjusted in a mixer set up after the drying mill, wherein the sprayed substance, if so desired, is freed from the secondary grain. Mixing is necessary in order to obtain strictly uniform batches.

The following examples illustrate the invention:

EXAMPLE 1

500 kg of manganese(IV) oxide and 850 kg of a 50% aqueous sodium hydroxide solution were heated in an agitating autoclave for 5 hours to 220° C. A pressure of 5 atmospheres gauge was built up. 200 l of water were pumped into the suspension by means of a pressure pump. Subsequently, the suspension was forced into a vessel with 2 cbm of water and washed with decantion (about 4 to 5 times) until the sodium content, calculated on $MnO_2$, amounted to 10%. The suspension is then fed into a Perl mill, where the passage rate was adjusted in such a way that a specific surface of the solid matter of 12 $m^2/g$ was formed. The obtained liquid, which was still capable of being pumped, was then dried in a spraying tower. The exhaust air temperature was adjusted in such a way that the obtained pulverulent spray product contained 8% of water. The thus obtained product was ground additionally in a mill for dry products, in order to crush secondary particles, then blended.

The aforedescribed test was then repeated 4 times with slowly increasing exhaust air temperatures, water contents of 6, 4.5, 3 and 2% being obtained.

Under comparable conditions the curing properties for polysulfide polymer were determined for the active manganese(IV) oxides, which had been prepared according to the aforedescribed examples.

The dependence of the processing time of a polysulfide polymer composition on the water content of the manganese(IV) oxide used as curing agent, is represented in FIG. 1.

The test was performed according to the following method:

To avoid errors which may be caused by moisture and temperature variations, the measurements were carried out in an air-conditioned room at 20° C and 65% of relative humidity.

(a) Processing time

The substances which were necessary for the measurements (ref. to table 1) were weighed into a porcelain bowl and blended to a paste. For thorough homogenization, the premixed paste was led 10 times over a friction roll at a gap width of 0.2 mm. 6 g of this paste were weighed in a mortar tared to a precision of 0.1 g on a precision balance, 20 g of Thiokol ® LP 32 were added and the ensemble triturated for 2 minutes with a pestle. Part of the composition was charged immediately into a measuring beaker of a rheometer according to Epprecht and operation of the apparatus was started at a bath temperature of 35° C. The processing time was considered terminated after the composition had reached 110 000 poises.

(b) Curing

The remainder of the composition was cast in a metal ring (diameter 45 mm, height 6 mm laid on a glass plate), which was stored at 20° C and served to determine the Shore-A hardness. The test was performed according to DIN 53 505.

EXAMPLE 2

2500 kg of manganese(IV) oxide and 4100 kg of a 50% aqueous sodium hydroxide solution were heated to 200° C for 9 hours in an agitating autoclave. A pressure of 5 atmosphere gauges was built up. After termination of the reaction time, 500 liters of water were pumped into the autoclave and the suspension subsequently forced into a vessel with about 10 cubic meters of water. The product was washed with decantion approximately 3 to 5 times, so that the subsequently sprayed solid product contained sodium in an amount of 10%. The thus obtained solid substance was divided in 4 batches corresponding to the 400 kg of solid matter and fed into a Perl mill, the passage rate varying for each batch. The throughput speed was adjusted in such a way that the subsequently sprayed, ground, and blended batches exhibited surfaces of 2, 6, 11 and 16 $m^2/g$ (according to BET). When spraying, the tower was adjusted so as to achieve a water content of 2% for all the batches.

The dependence of the processing time of a polysulfide polymer composition on the specific surface of the manganese(IV) oxide used as curing agent is represented in FIG. 2.

EXAMPLE 3

2300 kg of manganese(IV) oxide and 4000 kg of a b 50% sodium hydroxide solution were heated in an agitating autoclave to 220° C for 9 hours. Subsequently, 400 liters of water were forced into the reaction vessel with a pump and the suspension squeezed off in 5 batches through a filter press. The different batches were washed out with water to a sodium content of 0.1;

1; 4; 6 and 10%. When water washing became ineffective, the operation was continued with diluted sulfuric acid (up to 10%). The filter cake which had been worked up to a 35% suspension and which contained batches with 0.1 to 10% of sodium, was ground in a Perl mill to a specific surface of 12 m²/g and sprayed in a spraying tower at an exhaust air temperature of 110° C to a powder containing 2% of water and was subsequently ground and mixed.

The dependence of the processing time of a polysulfide polymer composition on the sodium content of the manganese(IV) oxide used as curing agent is represented in FIG. 3.

EXAMPLE 4

2300 kg of manganese(IV) oxide and 4000 kg of a 50% sodium hydroxide solution were heated for 9 hours in an agitating autoclave to about 220° C. 400 l of water were forced into the reaction vessel by a pump and the suspension squeezed off through a filter press and washed with water until it was neutral. The filter cake was worked up to a 35% suspension, ground by a Perl mill to a specific surface of 12 m²/g and acidified with sulfuric acid to pH 1 and washed out to a sodium content of 0.1%. The suspension prepared in such a way was divided in ten equal batches. The first five of these batches were treated each with a 10% copper sulfate solution, containing respectively 46 kg 184 kg, 176 kg resp. 368 and 460 kg of $CuSO_4.5 H_2O$.

The next 5 batches were treated each with an about 10% cobalt nitrate solution containing respectively 57 kg, 228 kg, 432 kg, 456 kg and 570 kg of $CO(NO_2)_2.6 H_2O$.

The proportion of these ions in the manganese(IV) oxide may vary from 1 to 10%, depending on the quantity of cobalt salt resp. copper salt added.

After having added the metal salt solutions, the suspensions were stirred for 2 hours, then squeezed out and washed with water until they were almost free from anions.

The products were submitted to a shelf drying step at about 120° C, so that the final moisture was 2%. After a dry grinding and subsequent mixing operation the products were suitable for polysulfide curing.

The polysulfide curing properties were tested in accordance with the method described in example 1. The measurement results obtained according to the test method are represented graphically in FIG. 4.

EXAMPLE 5

Batch 1

4.3 kg of manganese(IV) oxide
7.5 kg of a 50% sodium hydroxide solution

Batch 2

4.1 kg of manganese(IV) oxide
0.2 kg of lead(II) oxide
7.5 kg of a 50% sodium hydroxide solution

Batch 3

3.8 kg of manganese(IV) oxide
0.5 kg of lead(II) oxide
7.5 kg of a 50% sodium hydroxide solution The batches 1 to 3 were heated for 9 hours to 220° C in a 10 l agitating autoclave. After the reaction time the suspension was introduced into a 30 l vessel and washed with decantion 3 to 4 times with water, until the manganese(IV) oxide contained 10% of sodium ions.

After having adjusted the suspension to 35% of solid matter, a Perl mill operation was carried out, using a grinding speed such that the surface of the final product—measured according to BET—was 12m²/g. After the wet grinding the product was dried to a residual moisture of 2%. The product is ground and homogenized.

The polysulfide curing properties were tested according to the method described in example 1.
Composition of the mixture submitted to the test:
20.0 g of manganese(IV) oxide
40.0 g of HORDAFLEX ®SP (chlorinated aliphatic hydrocarbon)
3.5 g of stearic acid
6.0 g of paste for 20.0 g of THIOKOL ®LP 32
The following test results were obtained:

|  | Batch 1 | Batch 2 | Batch 3 |
|---|---|---|---|
| Processing time (in minutes) | 240 | 160 | 90 |

EXAMPLE 6

Batch 1

4.3 kg of manganese(IV) oxide
3.5 kg of a 50% sodium hydroxide solution

Batch 2

4.1 kg of manganese(IV) oxide
0.2 kg of lead(IV) oxide
3.5 kg of a 50% sodium hydroxide solution

Batch 3

3.8 kg of manganese(IV) oxide
0.5 kg of lead(IV) oxide
7.5 kg of a 50% sodium hydroxide solution The preparation and work-up of the batches was carried out in accordance with example 5.

The polysulfide curing properties were tested according to the method described in example 1.
Composition of the mixture submitted to the test:
20.0 g of manganese(IV) oxide
40.0 g of HORDAFLEX ®SP
3.5 g of stearic acid
6.0 g of paste for 20.0 g of THIOKOL ®LP 32.
The following results were obtained by the test:

|  | Batch 1 | Batch 2 | Batch 3 |
|---|---|---|---|
| Processing time (in minutes) | 240 | 120 | 55 |

TABLE 1

| Composition of the test mixture | | | | |
|---|---|---|---|---|
|  | Example and figure | | | |
| Components | 1 | 2 | 3 | 4 |
| Manganese (IV) oxide with various water contents | 20 g | | | |
| various particle sizes |  | 20 g | | |
| various sodium contents |  |  | 20 g | |
| various foreign metal ions portions |  |  |  | 20 g |
| HORDAFLEX⁽ᴿ⁾SP | 40 g | 40 g | 40 g | 40 g |
| stearic acid | 3.5 g | 3.5 g | — | — |
| Paste for 20 g of THIOKOL ⁽ᴿ⁾LP 32 | 6.0 g | 6.0 g | 3.8 g | 3.8 g |

What is claimed is:

1. A curing agent for polysulfide polymer compositions based on manganese(IV) oxide containing from 1 to 15% by weight, based on the weight of manganese(IV) oxide, of metal other than manganese selected from alkali metals, foreign metals and mixtures thereof, and from 0.1 to 8% by weight of water, said manganese(IV) oxide having a specific surface of 5 to 20 $m^2/g$.

2. A process for the manufacture of a curing agent for polysulfide polymers which comprises treating an oxidic manganese compound having an oxidation number of 2 to 4 with an alkali lye at a temperature of 120° to 400° C. under a pressure of 1 to 15 bars, washing the resulting material with water which may contain up to 10% of acid to produce a lattice containing from 0.1 to 15% by weight of alkali metal, grinding the washed material to a specific surface of 5 to 20 $m^2/g$ and drying it to a water content of 0.1 to 8% by weight.

3. A process according to claim 2 wherein oxygen is added to the material during the treatment with alkali lye.

4. A process according to claim 2 wherein after water washing and prior to grinding a soluble foreign metal compound in an amount of up to 10% by weight, based on the weight of manganese(IV) oxide, is added to the material.

5. A process in accordance with claim 2 wherein the oxidic manganese compounds are used in a mixture with up to 10% of foreign metal oxides.

6. A process in accordance with claim 2 wherein the grinding step is carried out with a Perl mill.

7. A process in accordance with claim 2, which comprises drying in a spraying tower.

8. A process in accordance with claim 7, which comprises submitting the product obtained after the spray drying step to a dry grinding operation.

* * * * *